United States Patent [19]

Takasaka

[11] 4,039,876
[45] Aug. 2, 1977

[54] IMPROVED SUPPORTING ARRANGEMENT FOR HOLLOW CYLINDRICAL ARMATURE WINDING

[75] Inventor: Keita Takasaka, Hitachi, Japan

[73] Assignee: Hitachi, Ltd., Japan

[21] Appl. No.: 610,784

[22] Filed: Sept. 5, 1975

[30] Foreign Application Priority Data

Sept. 13, 1974 Japan .............................. 49-105039

[51] Int. Cl.$^2$ .............................................. H02K 1/22
[52] U.S. Cl. ...................................... 310/266; 310/45
[58] Field of Search ................. 310/266, 265, 261, 43, 310/45, 264, 262, 265, 267, 42

[56] References Cited

U.S. PATENT DOCUMENTS

| 1,823,333 | 9/1931 | Oswald | 310/265 |
|---|---|---|---|
| 3,388,458 | 6/1968 | Logan | 310/271 |
| 3,483,413 | 12/1969 | Logan | 310/271 |
| 3,532,916 | 10/1970 | Fisher | 310/266 |
| 3,623,220 | 11/1971 | Chase | 310/264 |
| 3,668,452 | 6/1972 | Hu | 310/266 |
| 3,816,907 | 6/1974 | Small | 310/266 |

*Primary Examiner*—R. Skudy
*Attorney, Agent, or Firm*—Craig & Antonelli

[57] ABSTRACT

A cylindrical armature has a rotor ring firmly fitted on a shaft, and an armature winding arranged cylindrically and coaxially with the rotor ring and having at least a uniform inner cylindrical insulating layer in closed contact with the inner peripheral surface of the cylindrical armature winding, one end of the armature winding being fixed on the outer peripheral surface of the rotor ring. The outer peripheral surface of the rotor ring, through which the armature winding is coupled with the rotor ring, has grooves knurled at almost the same angle as the angle at which a filament constituting the inner cylindrical insulating layer is wound, whereby a reinforcing layer is formed integrally with the inner cylindrical insulating layer within the knurled grooves, when the filament is wound up.

9 Claims, 6 Drawing Figures

IMPROVED SUPPORTING ARRANGEMENT FOR HOLLOW CYLINDRICAL ARMATURE WINDING

BACKGROUND OF THE INVENTION

1. Field of the Invention

This invention relates to a cylindrical armature or more in particular to a coreless armature in which a rotor cup and a shaft are coupled securely to each other.

2. Description of the Prior Art

In the conventional cylindrical armature of the above-mentioned type, a glass filament impregnated with resin is spirally wound on the whole peripheral surface of a mandrel, thus forming an inner cylindrical insulating layer. On this insulating layer, an armature winding is arranged cylindrically. Another glass filament also impregnated with resin is spirally wound on the whole outer periphery of the armature winding thereby to form an outer cylindrical insulating layer.

As many taps as the coils of the armature winding are taken out at one end of the armature winding and connected to a commutator bar.

After forming the insulating layers on the inner and outer peripheral surfaces of the armature winding, the resin is hardened thereby to form a rotor cup. This rotor cup is securely bonded, by means of a bonding agent and by the use of an appropriate jig, on the outer peripheral surface of a rotor ring already firmly fixed on the shaft.

In such a conventional method, a layer of the bonding agent is unavoidably formed in the junction between the rotor cup and the rotor ring.

The transmission of the torque generated in the rotor cup to the shaft solely depends on the bonding agent between rotor cup and rotor ring. Therefore, the torque transmissibility is determined by the shearing stress of the bonding agent. In actual operation, ambient temperatures are so unfavorable that the differences in the coefficients of thermal expansion of the rotor cup, the rotor ring and the bonding agent cause a thermal stress, thus adversely affecting the bonding strength of the bonding agent.

Further, the fact that the rotor cup formed by hardening resin is bonded to the rotor ring by means of an assemblying jig causes an out-of-alignment situation between the rotor cup and the shaft or the crossing of the axis of the rotor cup with that of the shaft. Such an out-of-alignment or crossing of the axes causes an unbalanced rotation and an increased gap between the armature and the stator, resulting in a deteriorated efficiency.

As will be noted from the above description, the conventional method for bonding the rotor cup to the rotor ring not only lacks the reliability in bonding strength but also deteriorates the quality and electric efficiency of the machine.

SUMMARY OF THE INVENTION

The present invention has been accomplished in view of the above-described disadvantages, and has an object to improve the bonding strength between the rotor cup and the rotor ring on the one hand and to attain a higher accuracy to working for coupling between the rotor cup and the rotor ring, thus improving both the reliability and characteristics of the motor.

A main feature of the present invention lies in that knurled grooves are formed on the outer peripheral surface of the rotor ring firmly fixed on the shaft. The knurled grooves are provided at substantially the same angle as the winding angle of the glass filament forming the inner cylindrical insulating layer of the armature winding. In forming the inner cylindrical insulating layer of the armature winding, a reinforcing layer integral with the inner cylindrical insulating layer is provided within the knurled grooves on the outer peripheral surface of the rotor ring.

DESCRIPTION OF THE PREFERRED EMBODIMENTS

Embodiments of the present invention will be described below with reference to the accompanying drawings.

Figure 1:
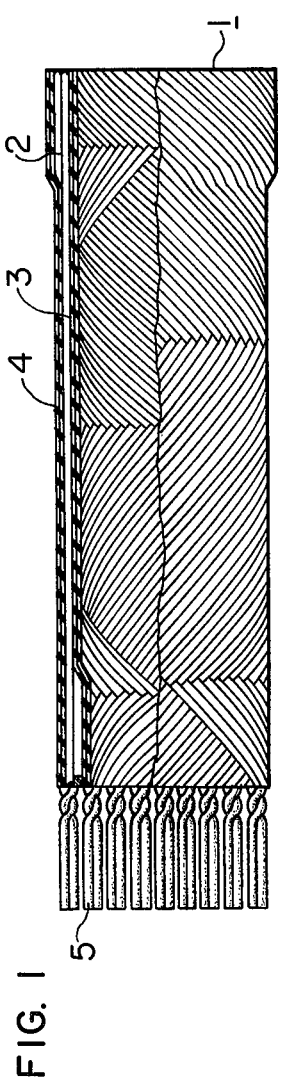
FIG. 1 is a partially sectional view showing a rotor cup of the cylindrical armature according to the present invention.

A partially sectional view of the rotor cup 1 of the cylindrical armature according to the invention is shown in FIG. 1. The rotor cup 1 comprises an armature winding 2 arranged cylindrically, an inner cylindrical insulating layer 3 and an outer cylindrical insulating layer 4. The inner insulating layer 3 and the outer insulating layer 4 are wound in spiral form around the axis of the armature winding and made of glass filaments respectively which are previously impregnated with resin and disposed on the inner and outer peripheral surfaces of the armature winding 2, respectively.

Reference numeral 5 shows taps located at one end of the armature winding 2, which provide connection with the commutator bars not shown in the drawing.

A method of fabricating an armature having the above-mentioned rotor cup will be explained below with reference to FIGS. 2 to 4.

Figure 2:
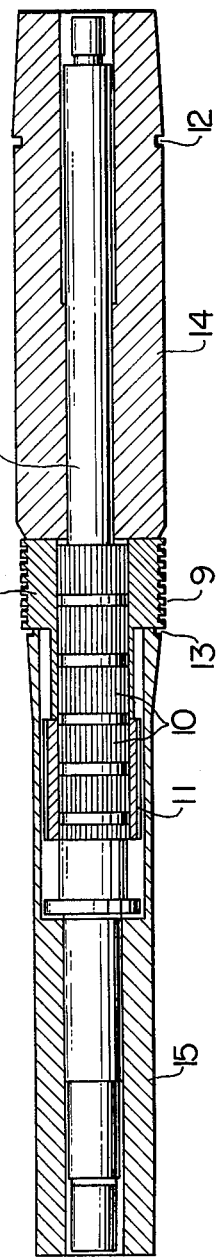
FIG. 2 is a sectional view of the assembly of a shaft and a mandrel prior to the formation of the inner cylindrical insulating layer according to the present invention.

Referring to FIG. 2, a knurled portion 10 is formed in advance on the surface of a shaft 6. A rotor ring 7 and a commutator 11 are firmly fitted and fixed on the knurled portion 10. The ends of the shaft 6 are inserted into mandrels 14 and 15 having notches 12 and 13 respectively, so that only the outer peripheral surface of the rotor ring 7, through which the rotor cup 1 is coupled with the rotor ring 7, is exposed.

Figure 3:
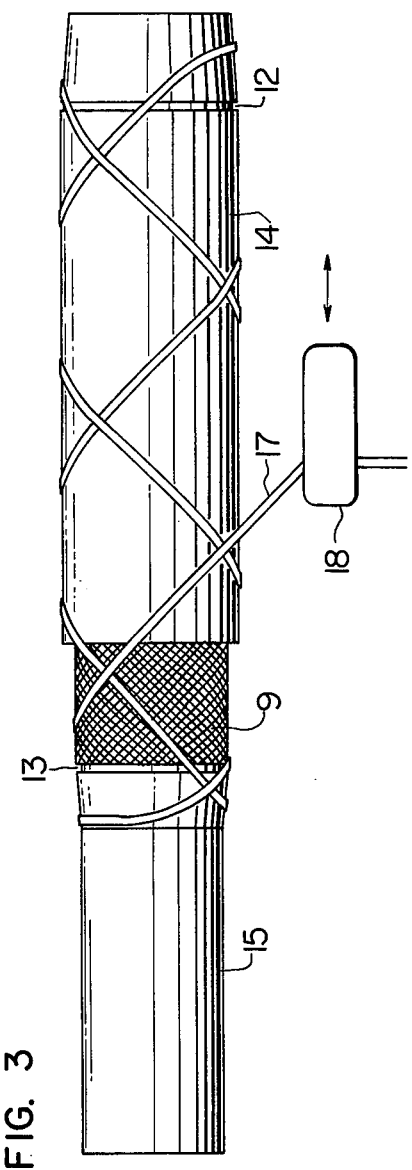
FIG. 3 is a diagram for explaining the manner in which the inner cylindrical insulating layer is formed.

On the outer peripheral surface of the mandrel 14, the exposed outer peripheral surface of the rotor ring and a part of the outer peripheral surface of the mandrel 15, a glass filament 17 is wound spirally in continuous reciprocation by a winding machine as shown in FIG. 3. The glass filament 17 is impregnated with resin in advance and wound through a traverser 18.

The mandrels 14 and 15 and the traverser 18 are kept at a constant speed. Therefore, the glass filament 17 continues to be wound at a fixed angle, until the entire surfaces of the mandrel 14 and the rotor ring 7 have been covered.

The exposed outer peripheral surface of the rotor ring 7 is provided with grooves 9 knurled at the same angle as the winding angle of the glass filament 17. Part of the glass filament 17 is thus intruded into the knurled grooves 9 on the outer peripheral surface of the rotor ring 7, so that the knurled grooves 9 are filled with the glass filament 17 and the resin soaked therein.

In this way, the glass filament 17 is wound over the entire outer peripheral surfaces of the mandrel 14 and the rotor ring 17 to form the inner cylindrical insulating layer 3.

The inner insulating layer 3, after being cured, is cut off at the notches 12 and 13 of the mandrels 14 and 15. The mandrel 15 is taken off from the shaft 6, and then the armature winding 2 is arranged on the inner insulating layer 3. The taps 5 at one end of the armature winding 2 are connected to the commutator 11.

After winding the armature winding 2 on the inner insulating layer 3 in this way, the mandrel 15 is again fixed on the shaft 6. The glass filament 17 is wound in the same manner as in the case of the inner insulating layer 3, thus forming the outer cylindrical insulating layer 4. This outer peripheral insulating layer 4 is cured and cut off at the positions of the notches 12 and 13 of the mandrels 14 and 15. The mandrels 14 and 15 are removed from the shaft 6.

Figure 4:
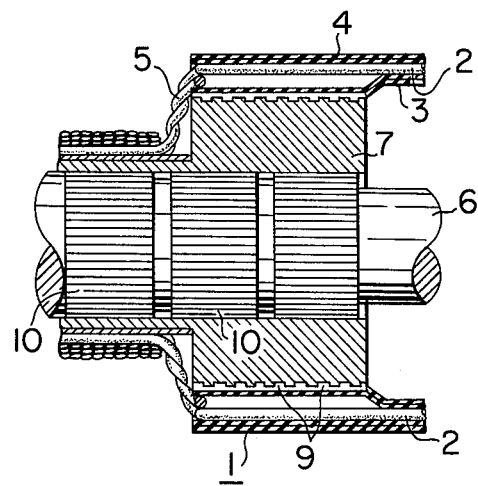
FIG. 4 is an enlarged sectional view of the coupling between the rotor ring and the rotor cup.
Figure 5:
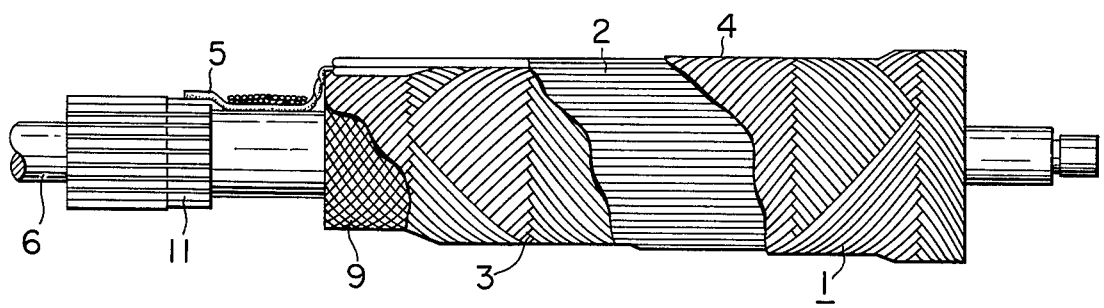
FIG. 5 is a partially cut-away front view of a finished product of the armature according to the present invention.

The state in which the rotor cup 1 is coupled with the rotor ring 7 is shown in FIG. 4. As will be seen from the drawing under consideration, part of the inner insulating layer 3, together with the resin, is buried in the knurled grooves in the outer peripheral surface of the rotor ring 7. This particular part of the inner insulating layer 3 is hardened and forms a reinforcing layer, thus resulting in a very high strength of bondage between the rotor cup and the rotor ring 7. A partially cut-away view of the apparatus of the invention thus completed is illustrated in FIG. 5.

Figure 6:
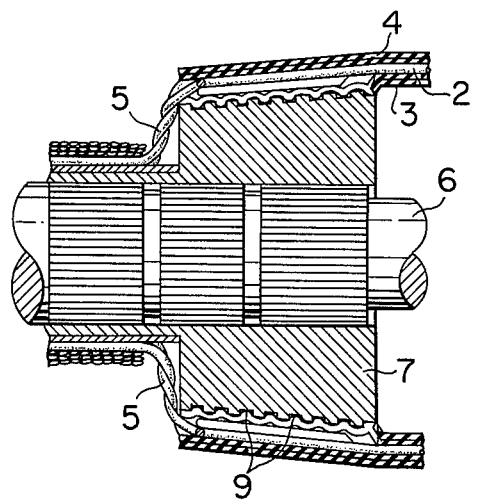
FIG. 6 is an enlarged sectional view showing the essential parts of another embodiment of the invention.

Another embodiment of the invention is shown in FIG. 6. This embodiment has a larger bonding area to attain an increased bonding strength between the rotor ring 7 and the rotor cup 1. For this purpose, the outer peripheral surface of the rotor ring 7 is tapered, and this particular surface is knurled to form the grooves 9 at almost the same angle as the angle at which the glass filament 17 is wound, thus providing a reinforcing layer integral with the inner insulating layer 3 within the knurled grooves 9.

It will be noted from the foregoing description that, according to the present invention, the inner cylindrical insulating layer 3 of the rotor cup 1 is formed by winding the glass filament 17 in spiral reciprocation. At the same time, the glass filament 17 is wound on the outer peripheral surface of the rotor ring 7 which is provided with the grooves 9 at the same angle as the angle at which the filament 17 is wound, thus forming a reinforcing layer within the grooves. As compared with the conventional armature in which the rotor cup and the rotor ring are coupled with each other only by means of a bonding agent, the armature according to the invention has a much higher bonding strength. Further, part of the glass filament 17 is tightly forced into the knurled grooves 9, thus largely increasing the torque transmissibility from the rotor cup 1 to the rotor ring 7, unlike the conventional method depending for torque transmission only on the bonding agent.

Also, the fact that the glass filament 17 is forced into the knurled grooves 9 and resin hardened in such a state prevents and undesirable slip between the rotor cup 1 and the rotor ring 7 or the separation of one from the other, by rendering the depth of the knurled grooves 9 larger than the magnitude of possible variation of the dimension of the rotor ring 7, th insulating layer 3 of the rotor cup 1 and the resin all of which may have different coefficients of thermal expansion.

Furthermore, since a reinforcing layer integral with the inner insulating layer 3 is formed by winding the filament 17 directly on the rotor ring 7, an out-of-alignment situation or a crossing between the axes of the rotor cup 1 and the shaft 6 is substantially eliminated.

It will thus be understood that according to the present invention, the glass filament constituting the insulating layer is forced into the knurled grooves cut in the outer peripheral surface of the rotor ring, and therefore the rotor cup is coupled with the rotor ring with the bonding strength of a bonding agent or resin plus that of the glass filament, thus completing a very strong armature. Still another advantage of the invention is the already-mentioned reinforcing layer formed integrally and concurrently with the inner cylindrical insulating layer on the outer peripheral surface of the rotor ring. As a result, there is a less chance of a displacement of the axis of the rotor cup out of alignment with the axis of the shaft as well as a crossing between them. This greatly contributes to the accuracy in assembly and to an improved performance of the motor.

I claim:

1. A cylindrical armature comprising an armature winding cylindrically arranged, and a rotor ring fixed on a shaft, said armature winding having at least an inner cylindrical insulating layer formed by winding filament member at least on the inner peripheral surface of said armature winding, said armature winding having an end fixed on the outer peripheral surface of said rotor ring, said rotor ring having a plurality of knurled grooves in the surface thereof through which surface said armature winding is coupled with the rotor ring, said knurled grooves being cut at substantially the same angle as the angle at which said filament member of said inner cylindrical insulating layer is wound, whereby a reinforcing layer is formed integrally with said inner cylindrical insulating layer within said knurled grooves.

2. A hollow cylindrical armature comprising a rotor shaft, a rotor ring fixed on said shaft and having an outer peripheral surface provided with a plurality of circumferential grooves disposed in planes angularly disposed with respect to the axis of said rotor ring and said shaft, an elongated cylindrical insulating layer formed of a wound filament member supported at one end thereof on the outer surface of said rotor ring with said filament member being wound into the grooves in the surface of said rotor ring, and a cylindrically arranged armature winding disposed on the outer peripheral surface of said insulating layer.

3. A hollow cylindrical armature as defined in claim 2 wherein said wound filament member is impregnated with an insulating resin.

4. A hollow cylindrical armature as defined in claim 2 wherein said. circumferential grooves extend in two directions with respect to the axis of said rotor ring and said shaft so as to provide a knurled configuration on the outer peripheral surface of said rotor ring.

5. A hollow cylindrical armature as defined in claim 4, further including a second insulating layer disposed over said armature winding and having the same construction as said elongated cylindrical insulating layer supported on said rotor ring.

6. A hollow cylindrical armature as defined in claim 5 wherein said wound filament member is impregnated with an insulating resin.

7. A hollow cylindrical armature as defined in claim 4 wherein said wound filament member is a glass filament impregnated with resin and wound in spiral reciprocation into the grooves in the outer peripheral surface of said rotor ring.

8. A hollow cylindrical armature as defined in claim 2 wherein the outer peripheral surface of said rotor ring is tapered.

9. A hollow cylindrical armature as defined in claim 2 wherein the depth of said circumferential grooves in the outer surface of said rotor ring exceeds the magnitude of possible variation of the diameter of said rotor ring due to possible thermal expansion and contraction thereof.

* * * * *